(12) United States Patent
Nakamura et al.

(10) Patent No.: US 10,829,075 B2
(45) Date of Patent: Nov. 10, 2020

(54) KNEE-AIRBAG-DEVICE ATTACHMENT STRUCTURE OF VEHICLE

(71) Applicant: MAZDA MOTOR CORPORATION, Hiroshima (JP)

(72) Inventors: Satoru Nakamura, Hiroshima (JP); Hideharu Kaeriyama, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 98 days.

(21) Appl. No.: 16/294,532

(22) Filed: Mar. 6, 2019

(65) Prior Publication Data
US 2019/0299900 A1    Oct. 3, 2019

(30) Foreign Application Priority Data

Mar. 29, 2018 (JP) .................................. 2018-063735

(51) Int. Cl.
| | |
|---|---|
| *B60R 21/206* | (2011.01) |
| *B62D 25/14* | (2006.01) |
| *B62D 1/16* | (2006.01) |
| *B60R 21/00* | (2006.01) |

(52) U.S. Cl.
CPC .............. *B60R 21/206* (2013.01); *B62D 1/16* (2013.01); *B62D 25/145* (2013.01); *B60R 2021/0051* (2013.01)

(58) Field of Classification Search
CPC .......... B60R 21/206; B60R 2021/0051; B60R 21/20; B62D 25/145; B62D 1/16
USPC ...................................................... 280/728.2
See application file for complete search history.

(56) References Cited

U.S. PATENT DOCUMENTS

| | | | | |
|---|---|---|---|---|
| 5,482,319 A | * | 1/1996 | Yoshimura | B60R 21/045 280/752 |
| 5,934,733 A | * | 8/1999 | Manwaring | B62D 25/145 280/752 |
| 7,832,764 B2 | * | 11/2010 | Kawashima | B60R 21/045 280/751 |
| 9,555,760 B2 | * | 1/2017 | Kim | B62D 25/145 |
| 9,580,107 B1 | * | 2/2017 | Ranga | B62D 29/004 |

(Continued)

FOREIGN PATENT DOCUMENTS

| | | | | |
|---|---|---|---|---|
| DE | 103 13 730 A1 | | 10/2004 | |
| DE | 10313730 B4 | * | 6/2010 | ........... B60R 21/206 |

(Continued)

OTHER PUBLICATIONS

The extended European search report issued by the European Patent Office dated Apr. 24, 2019, which corresponds to European Patent Application No. 19158977.9-1132 and is related to U.S. Appl. No. 16/294,532.

*Primary Examiner* — Ruth Ilan
*Assistant Examiner* — Kurtis Nielson
(74) *Attorney, Agent, or Firm* — Studebaker & Brackett PC (57) ABSTRACT

In a knee-airbag-device attachment structure of a knee-airbag device, an instrument-panel-member side bracket which connects the knee-airbag device and an instrument panel member to support the knee-airbag device comprises a branch bracket which is connected to an instrument panel core. The knee-airbag-device attachment structure further comprises a vehicle-body side bracket which connects the knee-airbag device and a hinge pillar of a vehicle body.

14 Claims, 5 Drawing Sheets

(56) References Cited

U.S. PATENT DOCUMENTS

| | | | | |
|---|---|---|---|---|
| 2003/0034672 A1* | 2/2003 | Nagy | B62D 25/145 | 296/203.02 |
| 2007/0221426 A1* | 9/2007 | Tsushima | B62D 25/145 | 180/240 |
| 2007/0290524 A1* | 12/2007 | Szoke | B62D 25/145 | 296/190.08 |
| 2009/0008911 A1* | 1/2009 | Meier | B60R 21/206 | 280/728.2 |
| 2009/0174223 A1* | 7/2009 | Penner | B60K 37/00 | 296/193.02 |
| 2013/0249201 A1* | 9/2013 | Fujiwara | B60R 21/045 | 280/752 |
| 2015/0056428 A1* | 2/2015 | Birka | B05D 3/102 | 428/209 |
| 2015/0291120 A1* | 10/2015 | Kim | B60R 21/206 | 280/728.2 |
| 2015/0344080 A1* | 12/2015 | Davos | B62D 25/145 | 296/205 |
| 2016/0059900 A1* | 3/2016 | Eshima | B60R 21/231 | 296/187.09 |
| 2016/0075298 A1* | 3/2016 | Ozawa | B60R 7/06 | 280/752 |
| 2018/0029555 A1* | 2/2018 | Gewert | B62D 25/145 | |
| 2018/0126940 A1* | 5/2018 | Greer, Jr. | B60R 21/206 | |
| 2019/0168818 A1* | 6/2019 | van Aken | B62D 29/04 | |
| 2019/0202390 A1* | 7/2019 | Ono | B60R 21/206 | |
| 2019/0299901 A1* | 10/2019 | Nakamura | B62D 25/2018 | |
| 2019/0300040 A1* | 10/2019 | Abe | B21D 22/04 | |
| 2020/0070893 A1* | 3/2020 | Atkin | B62D 29/04 | |
| 2020/0189661 A1* | 6/2020 | Kong | B60K 35/00 | |

FOREIGN PATENT DOCUMENTS

| | | | | |
|---|---|---|---|---|
| DE | 10 2011 051 699 A1 | | 1/2013 | |
| DE | 102015119229 A1 | * | 5/2017 | B62D 25/145 |
| DE | 202019103440 U1 | * | 7/2019 | B60R 21/206 |
| EP | 3333052 A1 | * | 6/2018 | B62D 25/145 |
| JP | 2012-076531 A | | 4/2012 | |
| JP | 2014-210548 A | | 11/2014 | |
| WO | WO-2005123466 A1 | * | 12/2005 | B62D 25/145 |
| WO | WO-2015043691 A1 | * | 4/2015 | B62D 65/14 |

* cited by examiner

KNEE-AIRBAG-DEVICE ATTACHMENT STRUCTURE OF VEHICLE

BACKGROUND OF THE INVENTION

The present invention relates to a knee-airbag-device attachment structure of a vehicle.

A knee-airbag device to protect a knee (knees) of an occupant when an accident occurs in a vehicle collision or the like has been used for a vehicle, such as an automotive vehicle. The knee-airbag device is arranged in front of a seat where an occupant is seated so that an airbag is inflatable toward the knee(s) of the occupant when the accident occurs.

Japanese Patent Laid-Open Publication No. 2014-210548, for example, discloses this kind of knee-airbag-device attachment structure in which a knee-airbag device is attached, via respective brackets, to an instrument panel reinforcement (instrument panel member) and a floor brace (instrument-panel-member supporting post) which is provided to extend from the instrument panel reinforcement to a tunnel portion of a floor panel. Further, Japanese Patent Laid-Open Publication No. 2012-76531 discloses a structure in which a knee-airbag device is attached to an instrument panel reinforcement via a bracket.

Herein, the knee-airbag device is required to inflate the airbag instantaneously (promptly) when the accident occurs, thereby protecting the occupant properly. Accordingly, since an attachment structure to support the knee-airbag device receives large impact during airbag inflation, it is needed that this attachment structure has the sufficiently large rigidity. However, if a support member of the attachment structure is configured to have a large plate thickness or a high-rigidity member is used as the support member of the attachment structure in order to increase the rigidity of the attachment structure, a vehicle weight so increases that the fuel economy (gas mileage) of the vehicle or the like may deteriorate.

SUMMARY OF THE INVENTION

The present invention has been devised in view of the above-described matter, and an object of the present invention is to provide a knee-airbag-device attachment structure of a vehicle which can secure the high support rigidity in the knee-airbag inflation, without increasing the weight.

The present invention is a knee-airbag-device attachment structure of a vehicle, comprising a knee-airbag device to protect a knee of an occupant, an instrument panel member extending in a vehicle width direction and attached to side faces of both sides of a vehicle body, and an instrument-panel-member side bracket connecting the instrument panel member and the knee-airbag device, wherein the instrument-panel-member side bracket comprises a bracket body and a branch bracket which is configured to branch off from the bracket body and connected to a core part of an instrument panel of the vehicle.

According to the present invention, since the knee-airbag device is connected to and supported at both of the instrument panel member and the core part of the instrument panel (hereafter, referred to as an "instrument panel core"), the support rigidity can be properly increased compared to a case where the knee-airbag device is connected to the instrument panel member only. Further, since the branch bracket is provided only as an additional member, a weight increase of the attachment structure can be properly suppressed.

In an embodiment of the present invention, the above-described knee-airbag-device attachment structure further comprises a vehicle-body side bracket connecting the vehicle body and the knee-airbag device.

According to this structure, since the vehicle-body side bracket is the one for attaching the knee-airbag device to the vehicle body which is positioned relatively closely to the knee-airbag devices (a hinge pillar of the vehicle, example), a length of the vehicle-body side bracket can be made properly short. Accordingly, even if the plate thickness of the vehicle-body side bracket is made large or the rigidity of the vehicle-body side bracket is made high by using the high-rigidity member, the weight increase can be properly suppressed because of the properly-short length of the vehicle-body side bracket. Thereby, securing of the high support rigidity and the weight saving can be compatibly attained for the attachment structure. Further, since the knee-airbag device is supported at the vehicle body via the vehicle-body side bracket, part of a load which is caused by inflation of a knee airbag is dispersed to the vehicle body having the high rigidity by way of the vehicle-body side bracket. Thereby, the load of the knee-airbag inflation can be properly supported at the vehicle body.

In another embodiment of the present invention, the branch bracket is configured to extend in a direction of inflation of a knee airbag of the knee-airbag device.

According to this structure, since supporting by means of the branch bracket is attained along an input direction of the load during the knee-airbag inflation, the load of the knee-airbag inflation can be supported efficiently.

In another embodiment of the present invention, the inflation direction of the knee airbag of the knee-airbag device is set to be rearwardly-and-downwardly inclined.

According to this structure, since the knee airbag can be inflated along a surface of a glove box which is provided in front of a seat (assistant driver's seat), the inflated knee airbag can be positioned properly between the glove box and the knee(s) of the occupant.

In another embodiment of the present invention, the vehicle-body side bracket is configured to have a plate-shaped portion partially at least, wherein the plate-shaped portion is configured such that a plate face thereof is positioned substantially perpendicularly to a vehicle longitudinal direction.

According to this structure, the support rigidity of the vehicle-body side bracket along the direction of the knee-airbag inflation (an obliquely downward direction) can be increased properly.

In another embodiment of the present invention, the knee-airbag-device attachment structure further comprises a heater-unit side bracket connecting the knee-airbag device and a lower panel of a heater unit.

According to this structure, since the knee-airbag device is supported at the heater unit via the heater-unit side bracket, the support rigidity can be further increased.

Other features, aspects, and advantages of the present invention will become apparent from the following description which refers to the accompanying drawings.

DETAILED DESCRIPTION OF THE INVENTION

Hereafter, an embodiment of the present invention will be described referring to the attached drawings.

Figure 1:
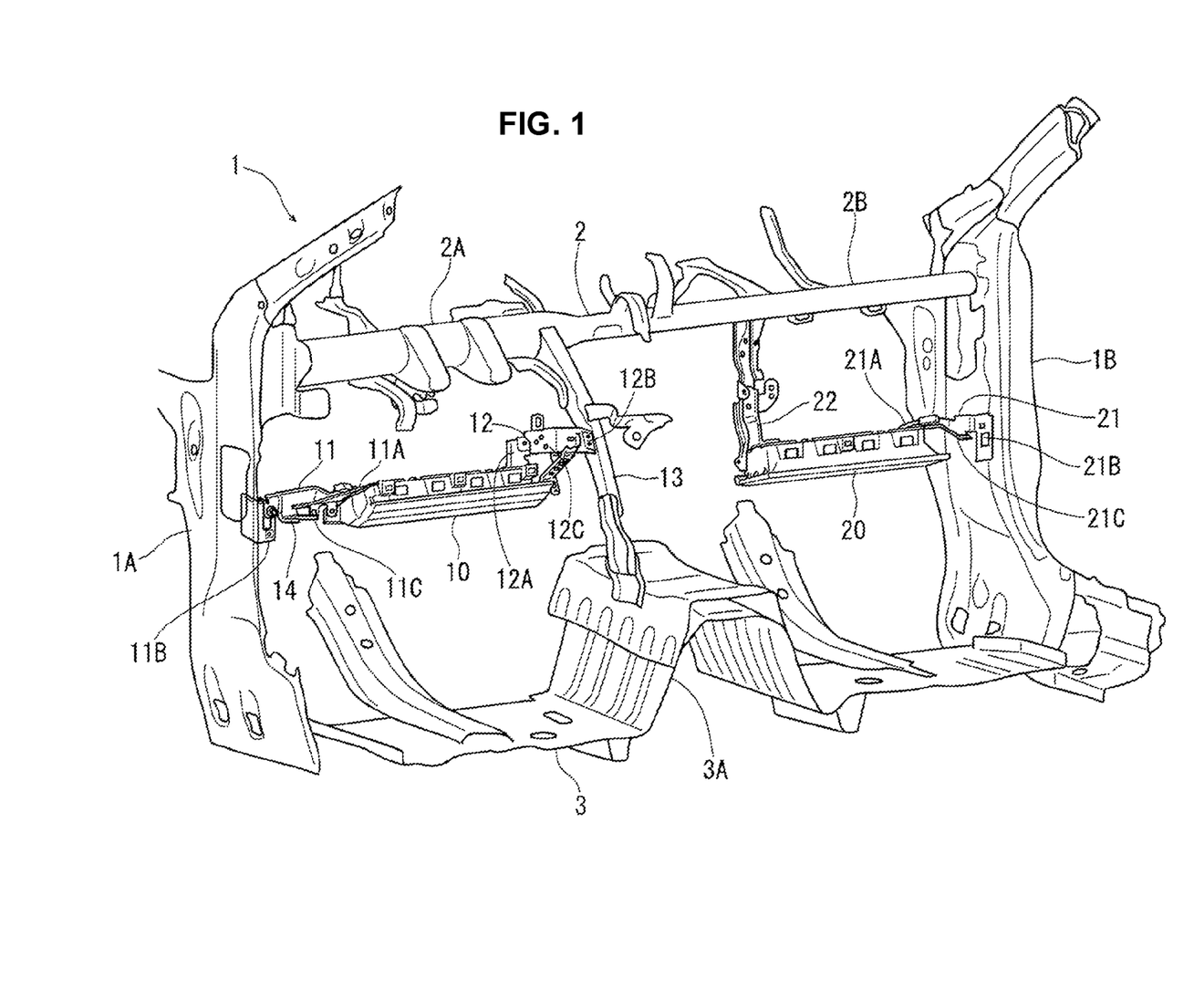
FIG. 1 is a perspective view showing a cabin front structure of a vehicle.

FIG. 1 shows a front structure of a cabin of a vehicle. In the drawings, only members related to the attachment structure of the knee-airbag device of the present invention in the cabin front structure are shown and illustration of the other members is omitted.

Figure 2:
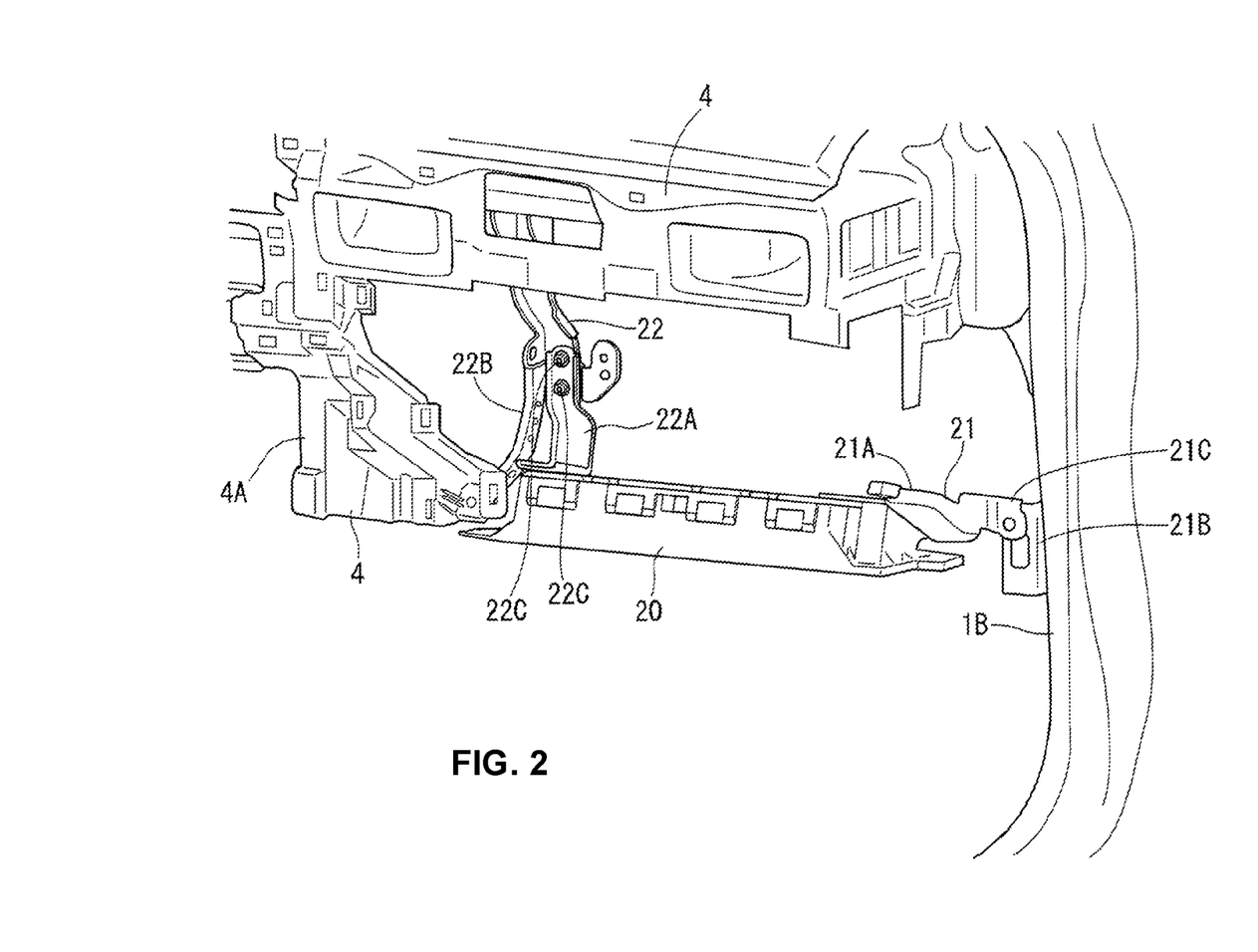
FIG. 2 is a perspective view showing an attachment structure of a knee-airbag device of an embodiment of the present invention.

As shown in the figures, an instrument panel member 2 is arranged between right-and-left hinge pillars 1A, 1B which constitute a part of a vehicle body 1. The instrument panel member 2 is made of a metal-made long member and arranged inside an instrument panel 4 (see FIGS. 2 and 3). The instrument panel member 2 is attached to the left hinge pillar 1A at an end portion of its driver's-seat side portion 2A (its left-side portion in FIG. 1), and is attached to the right hinge pillar 1B at an end portion of its assistant-driver's-seat side portion 2B (its right-side portion in FIG. 1), whereby the instrument panel member 2 is provided to extend in a vehicle width direction between the both-side portions 1A, 1B of the vehicle body 1.

Herein, the instrument panel member 2 is configured such that the driver's-seat side portion 2A which requires the higher mechanical strength has a larger diameter than the assistant-driver's-seat side portion 2B. The driver's-seat side portion 2A is configured such that a steering column, not illustrated, is attached to a central portion thereof.

A floor panel 3 is provided at a lower portion of the cabin and a tunnel portion 3A is formed at a central portion, in the vehicle width direction, of the floor panel 3. A driver's seat and an assistant driver's seat, which are not illustrated, are arranged on the floor panel 3 at positions located on right-and-left sides of the tunnel portion 3A.

The knee-airbag devices 10, 20 are respectively arranged in front of the driver's seat and the assistant driver's seat at respective positions which correspond to knees of occupants seated in those seats. Each of the knee-airbag devices 10, 20 includes an airbag inside thereof. This airbag is configured to be inflated by an inflator when the accident occurs and expand accordingly, breaking an outer frame (case) of each of the knee-airbag devices 10, 20, for the protection of the occupant's knees.

The driver's-seat side (left-side) knee-airbag device 10 is attached to the left hinge pillar 1A of the vehicle body 1 via a vehicle-body side bracket 11 at its left-side end, and this driver's-seat side (left-side) knee-airbag device 10 is also attached to an instrument-panel-member supporting post 13 via an instrument-panel-member supporting-post side bracket 12 at its right-side end. Meanwhile, the assistant-driver's-seat side (right-side) knee-airbag device 20 is attached to the right hinge pillar 1B of the vehicle body 1 via a vehicle-body side bracket 21 at its right-side end, and this assistant-driver's-seat side (right-side) knee-airbag device 20 is also attached to the instrument panel member 2 via an instrument-panel-member side bracket 22 at its left-side end.

Each of the knee-airbag devices 10, 20 is of a roughly rectangular solid shape and provided to extend roughly horizontally in the vehicle width direction (in a lateral direction). The vehicle-body side brackets 11, 21 are made of metal, for example, and these brackets 11, 21 respectively comprise knee-airbag side connection portions 11A, 21A which are connected to the knee-airbag devices 10, 20, vehicle-body side connection portions 11B, 21B which are connected to the hinge pillars 1A, 1B, and intermediate portions 11C, 21C which are provided at respective middle positions between the knee-airbag side connection portions 11A, 21A and the vehicle-body side connection portions 11B, 21B. The intermediate portions 11C, 21C of the vehicle-body side brackets 11, 12 are configured to extend roughly horizontally in the vehicle width direction from the knee-airbag devices 10, 20 toward the hinge pillars 1A, 1B.

Since the vehicle-body side brackets 11, 21 are attached to side portions (the hinge pillars 1A, 1B) of the vehicle body 1, each length of these brackets 11, 21 can be properly short. That is, since the knee-airbag devices 10, 20 are provided to extend in the vehicle width direction, each distance between the knee-airbag devices 10, 20 and the hinge pillars 1A, 1B is shorter than each distance between the knee-airbag devices 10, 20 and the instrument panel member 2, so that each length of these brackets 11, 21 can be properly short, compared to a case where the knee-airbag devices 10, 20 are connected to and supported at the instrument panel member 2. Further, since the intermediate portions 11C, 21C of the vehicle-body side brackets 11, 21 extend in the vehicle width direction and are attached to respective portions of the hinge pillars 1A, 1B which are positioned adjacently (the most closely), in the vehicle width direction, to the knee-airbag devices 11, 21, each length of the vehicle-body side brackets 11, 21 can be properly minimized. Accordingly, even if the plate thickness of each of the vehicle-body side brackets 11, 21 is made large or the rigidity of each of the vehicle-body side brackets 11, 21 is made high by using a high-rigidity member, the weight increase can be properly suppressed because of the properly-short length of each of the vehicle-body side brackets 11, 21, so that securing of the high support rigidity and the weight saving can be compatibly attained for the attachment structure.

Further, since the knee-airbag devices 10, 20 are respectively supported at the vehicle body 1 via the vehicle-body side brackets 11, 21, part of the inflation load of the knee airbags is dispersed to the vehicle body 1 having the large rigidity (the hinge pillars 1A, 1B) by way of the vehicle-body side brackets 11, 21. Accordingly, the inflation load of the airbags can be properly supported at the vehicle body 1. Moreover, load dispersion to the instrument panel member 2 which supports various members (the instrument panel, the steering column, and the like) and need to bear excessive loads accordingly can be made properly small.

Each of the intermediate portions 11C, 21C of the vehicle-body side brackets 11, 21 is of a plate shape, and this plate-shaped plate face is positioned substantially perpendicularly to the vehicle longitudinal direction (i.e., this plate-shaped plate face extends substantially in a vertical direction). Thereby, the support rigidity, in a direction of the knee-airbag inflation (i.e., in an obliquely-downward direction), of each of the vehicle-body side brackets 11, 21 can be properly increased.

Figure 3:
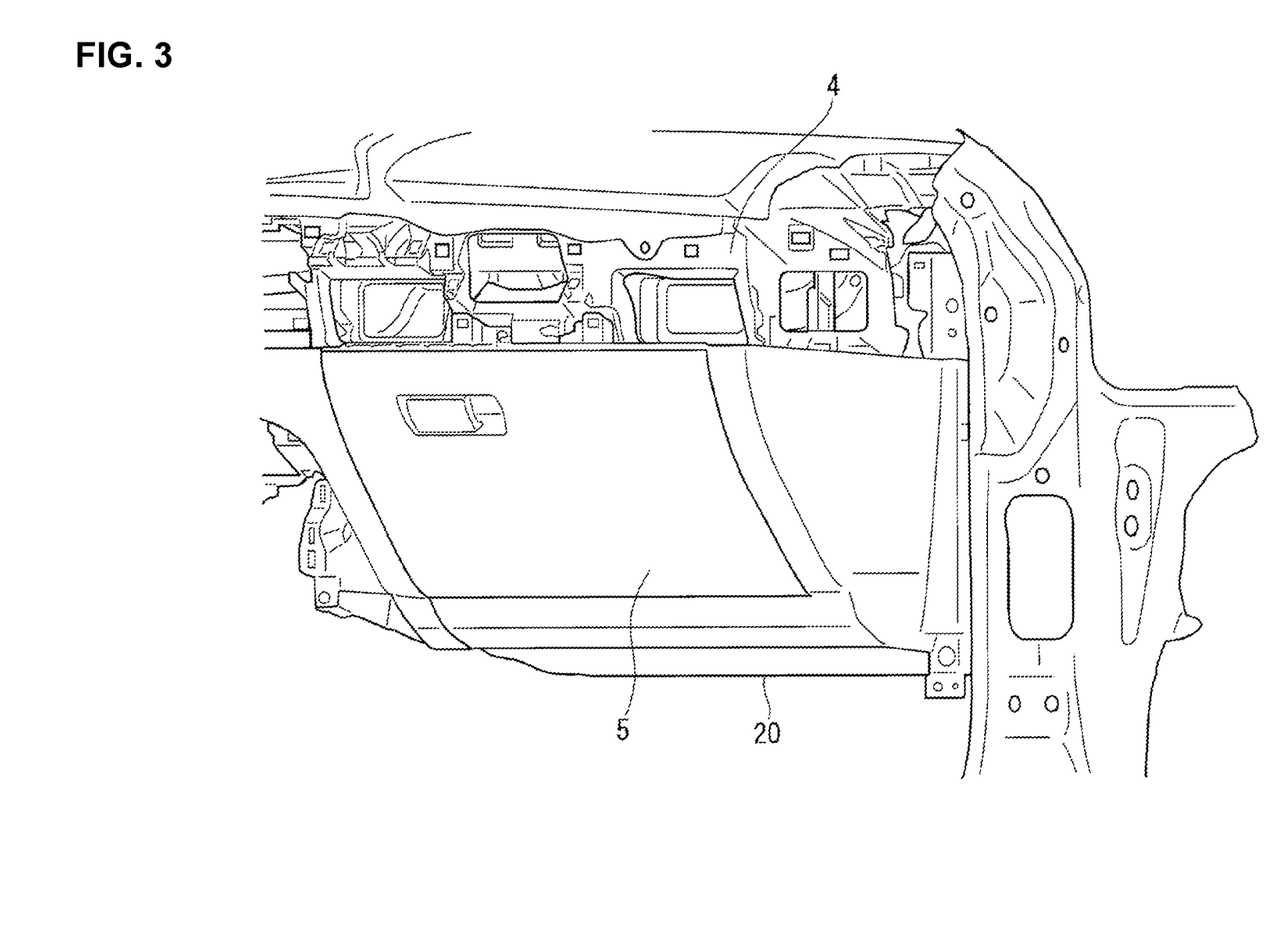
FIG. 3 is a perspective view showing a structure which is positioned in front of an assistant driver's seat.

FIGS. 2 through 5 show the attachment structure of the assistant-driver's-seat side knee-airbag device 20. Herein, a glove box 5 which constitutes a dashboard together with the instrument panel 4 is arranged in front of the assistant driver's seat as shown in FIG. 3, which is not illustrated in FIG. 1. This glove box 5 is positioned below the instrument panel 4. The knee-airbag device 20 is arranged below the glove box 5.

As illustrated, the instrument-panel-member side bracket 22 comprises a bracket body 22A and a branch bracket 22B which is configured to branch off from the bracket body 22A. The bracket body 22A is fixed to a left end portion of the knee-airbag device 20 at its lower end, and connected to the assistant-driver's-seat side portion 2B of the instrument panel member 2 at its upper end.

The branch bracket 22B is configured to branch off from an intermittent part of the bracket body 22A and extend obliquely rearwardly and downwardly, substantially in parallel to the bracket body 22A. In the present embodiment, the branch bracket 22B is provided as a separate member from the bracket body 22A, and is joined to the bracket body 22A via bolts 22C. However, the present invention is not limited to this structure, but the bracket body 22A and the branch bracket 22B may be formed as a single member.

A lower end of the branch bracket 22B is fixed to an extension portion of an instrument panel core 4A which extends downwardly (which extends to a position beside the knee-airbag device 20). Herein, this instrument panel core 4A is a core part which forms a surface of the instrument panel 4 (which is another part than various devices/components), which is made of resin having the high rigidity, for example.

Thus, the knee-airbag device 20 is connected to and supported at both of the instrument panel member 2 and the instrument panel core 4A via the instrument-panel-member side bracket 22. Accordingly, the support rigidity can be increased compared to a case where the knee-airbag device is connected to the instrument panel member 2 only. Further, since the branch bracket 23 is provided only as an additional member, the weight increase of the attachment structure can be properly suppressed.

The knee-airbag device 20 is supported by the vehicle-body side bracket 21 and the instrument-panel-member side bracket 22 such that the inflation direction of the knee airbag is rearwardly-and-downwardly inclined. Thereby, the knee airbag is inflated such that it goes around an assistant-driver's-seat side surface of the glove box 5, and then extends along the surface of the glove box 5, so that the knee airbag is properly positioned between the glove box 5 and knee(s) of an occupant seated in the assistant driver's seat.

Further, the branch bracket 22B is configured to extend in the inflation direction of the knee airbag of the knee-airbag device 20 (in a rearwardly-and-downwardly oblique direction). Thereby, since supporting by means of the branch bracket 22B is attained along an input direction of the load during the knee-airbag inflation, the load of the knee-airbag inflation can be supported efficiently.

Figure 4:
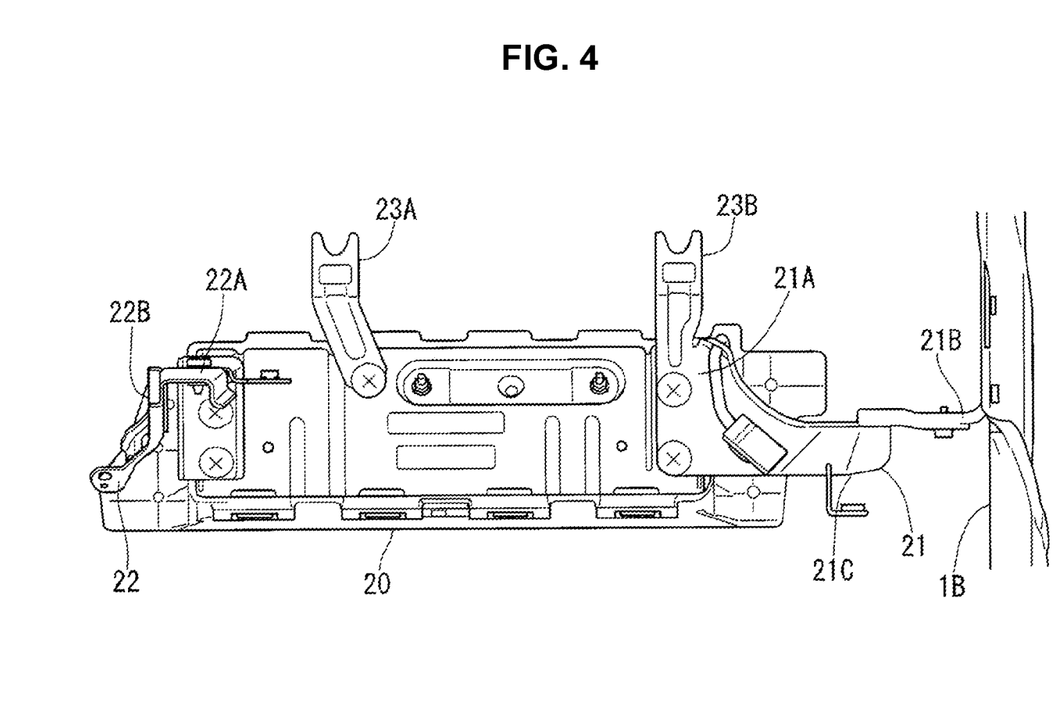
FIG. 4 is a plan view showing the attachment structure of the knee-airbag device of the embodiment of the present invention.
Figure 5:
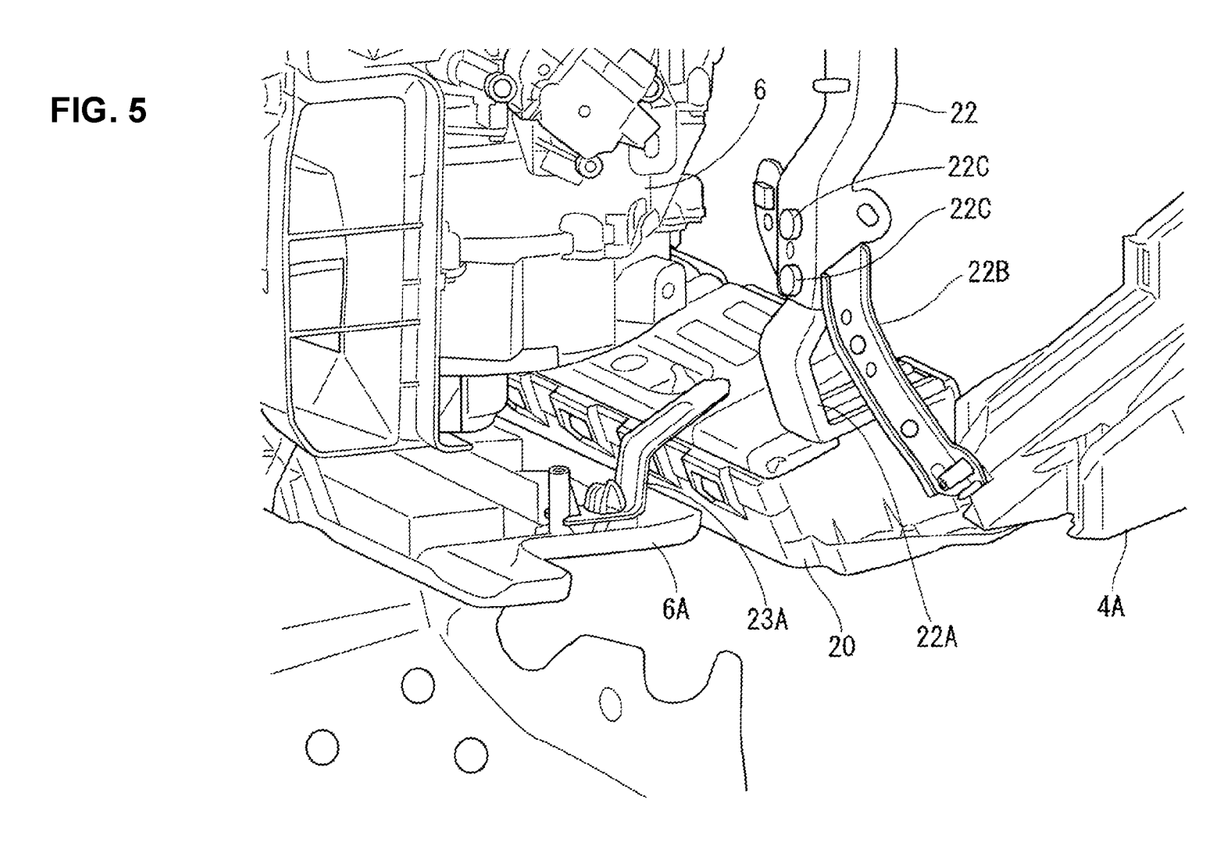
FIG. 5 is a perspective view showing the attachment structure of the knee-airbag device of the embodiment of the present invention.

As shown in FIGS. 4 and 5, a pair of right-and-left heater-unit side brackets 23A, 23B are provided at an upper face of the knee-airbag device 20. In the present embodiment, the heater-unit side bracket 23A which is arranged on the side of the instrument-panel-member side bracket 22 is fixed to the upper face of the knee-airbag device 20, and the heater-unit side bracket 23B which is arranged on the side of the vehicle-body side bracket 21 is provided integrally with the knee-airbag side connection portion 21A of the vehicle-body side bracket 21.

The heater-unit side brackets 23A, 23B extend vertically along a front side face of the knee-airbag device 20, then protrude forwardly, and are connected to a lower panel 6A of the heater unit 6 which is arranged in front of the instrument panel 4. Thereby, since the knee-airbag device 20 is also fixed to the heater unit 6 via the heater-unit side brackets 23A, 23B, the support rigidity can be further increased.

The present invention should not be limited to the above-described embodiment and any other modifications or improvements may be applied within the scope of a spirit of the present invention. For example, while the present invention (the instrument-panel-member side bracket comprising the branch bracket) is applied to an assistant-driver's-seat side structure in the above-described embodiment, it is applicable to a driver's-seat side structure. Further, the support structure positioned on an opposite side to the instrument-panel-member side bracket may be configured such that it is supported by the instrument panel member, not the vehicle-body side bracket, for example. Moreover, the instrument panel member may be configured in any structure where it is arranged between the right-and-left hinge pillars to support the instrument panel. For example, the shape of the instrument panel member is not limited to the elongated pile with a round-shaped cross-section as shown in the above-described embodiment, but may have a rectangular cross-section or open cross-section.

What is claimed is:

1. A knee-airbag-device attachment structure of a vehicle, comprising:
    a knee-airbag device to protect a knee of an occupant;
    an instrument panel member extending in a vehicle width direction and attached to side faces of both sides of a vehicle body; and
    an instrument-panel-member side bracket connecting the instrument panel member and the knee-airbag device,
    wherein said instrument-panel-member side bracket comprises a bracket body and a branch bracket which is configured to branch off from the bracket body and connected to a core part of an instrument panel of the vehicle.

2. The knee-airbag-device attachment structure of the vehicle of claim 1, further comprising a vehicle-body side bracket connecting the vehicle body and said knee-airbag device.

3. The knee-airbag-device attachment structure of the vehicle of claim 2, wherein said branch bracket is configured to extend in a direction of inflation of a knee airbag of said knee-airbag device.

4. The knee-airbag-device attachment structure of the vehicle of claim 3, wherein said inflation direction of the knee airbag of the knee-airbag device is set to be rearwardly-and-downwardly inclined.

5. The knee-airbag-device attachment structure of the vehicle of claim 4, further comprising a heater-unit side bracket connecting said knee-airbag device and a lower panel of a heater unit.

6. The knee-airbag-device attachment structure of the vehicle of claim 3, further comprising a heater-unit side bracket connecting said knee-airbag device and a lower panel of a heater unit.

7. The knee-airbag-device attachment structure of the vehicle of claim 2, wherein said vehicle-body side bracket is configured to have a plate-shaped portion partially at least, wherein the plate-shaped portion is configured such that a plate face thereof is positioned substantially perpendicularly to a vehicle longitudinal direction.

8. The knee-airbag-device attachment structure of the vehicle of claim 7, further comprising a heater-unit side bracket connecting said knee-airbag device and a lower panel of a heater unit.

9. The knee-airbag-device attachment structure of the vehicle of claim 2, further comprising a heater-unit side bracket connecting said knee-airbag device and a lower panel of a heater unit.

10. The knee-airbag-device attachment structure of the vehicle of claim 1, wherein said branch bracket is configured to extend in a direction of inflation of a knee airbag of said knee-airbag device.

11. The knee-airbag-device attachment structure of the vehicle of claim 10, wherein said inflation direction of the knee airbag of the knee-airbag device is set to be rearwardly-and-downwardly inclined.

12. The knee-airbag-device attachment structure of the vehicle of claim 11, further comprising a heater-unit side bracket connecting said knee-airbag device and a lower panel of a heater unit.

13. The knee-airbag-device attachment structure of the vehicle of claim 10, further comprising a heater-unit side bracket connecting said knee-airbag device and a lower panel of a heater unit.

14. The knee-airbag-device attachment structure of the vehicle of claim 1, further comprising a heater-unit side bracket connecting said knee-airbag device and a lower panel of a heater unit.

\* \* \* \* \*